A. J. BOWERS.

MULTIFOCAL LENS FOR EYEGLASSES.

APPLICATION FILED AUG. 10, 1911.

Reissued Oct. 10, 1911. 13,298.

Witnesses
R. D. Holman.
Penelope Bumberback.

Inventor
Albert J. Bowers.
By Rufus B. Fowler
Attorney

UNITED STATES PATENT OFFICE.

ALBERT J. BOWERS, OF WORCESTER, MASSACHUSETTS.

MULTIFOCAL LENS FOR EYEGLASSES.

13,298. Specification of Reissued Letters Patent. Reissued Oct. 10, 1911.

Original No. 993,820, dated May 30, 1911, Serial No. 408,182. Application for reissue filed August 10, 1911. Serial No. 643,447.

*To all whom it may concern:*

Be it known that I, ALBERT J. BOWERS, a citizen of the United States, residing at Worcester, in the county of Worcester and Commonwealth of Massachusetts, have invented a new and useful Improvement in Multifocal Lenses for Eyeglasses, of which the following is a specification accompanied by drawings, forming a part of the same, in which—

Figure 1:
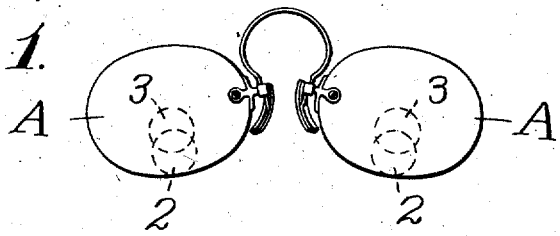
Figure 2:
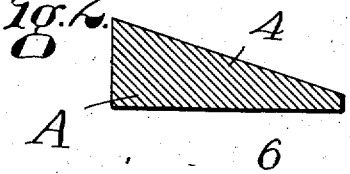
Figure 3:
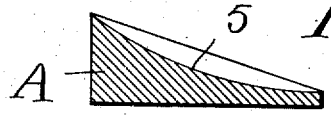
Figure 4:
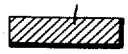
Figure 5:
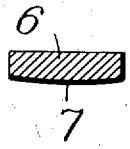
Figure 6:
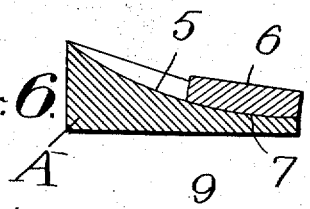
Figure 7:
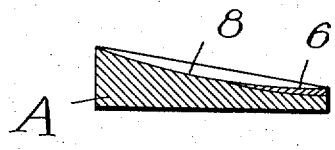
Figure 8:
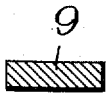
Figure 9:
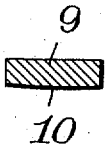
Figure 10:
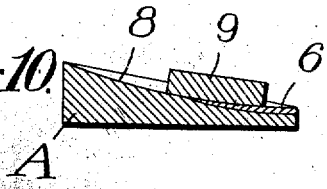
Figure 11:
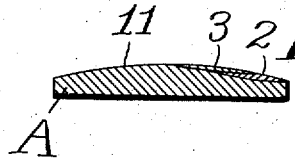
Figure 12:
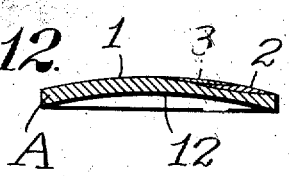

Figure 1 represents a front view of an eyeglass containing lenses embodying my invention. Figs. 2 to 12 inclusive represent different steps in the process of manufacturing my improved lens. Fig 2 represents in cross section a piece of glass forming the body portion of the lens. Fig. 3 represents the same piece of glass shown in Fig. 4, but with its oblique surface ground to form a curved seat for a glass wafer giving a second focal power. Figs. 4 and 5 represent the piece of glass from which the first wafer is made. Fig. 6 represents the application of the first wafer to the curved seat shown in Fig. 3. Fig. 7 shows the formation of a second curved seat of less radius than the first curved seat for the reception of the second wafer giving the third focal power. Figs. 8 and 9 represent the piece of glass from which the second wafer is formed. Fig. 10 represents the application of the second wafer to the curved seat shown in Fig. 7. Fig. 11 represents the lens with its outer face or surface ground to the desired curvature, and Fig. 12 represents the lens with its posterior surface ground to the desired curvature.

Similar reference letters and figures refer to similar parts in the different views.

It is the object of my present invention to produce a lens for an eyeglass or spectacle, having in different sections three distinct focal powers giving three fields or visions of different distances. The body portion of the lens I form from a piece of glass having a given refractive power, such for example as crown glass, which, when ground in the proper curvature, as shown in Fig. 12, will produce a lens having a refractive power of the greatest focal distance desired, near one edge of the body portion I grind a curved seat to receive a wafer formed of glass having a different refractive power, such for example as flint glass, and upon these combined pieces of glass and over-lapping them both I form a second curved seat for a second wafer also of flint glass. The curvature of the two seats for these wafers is varied to give different refractive powers to each wafer, the radius of the seat for the first applied wafer being less than the radius for the seat of the second applied wafer, whereby the first applied wafer will give a refractive power of less focal distance than the body portion of the lens and the refractive power of the second applied wafer will give a focal distance intermediate between the first wafer and the body portion of the lens. In Fig. 12 I have shown in cross section a complete lens in which 1 represents the body portion of the lens giving distant vision, 2 the first wafer giving reading vision and 3 the second overlapping wafer giving the third or intermediate vision.

The factors which determine the focal power of the body portion 1 of the lens are the refractive power of the crown glass and the shape or curvature of the lens. The additional factors which determine the reading vision as produced by the wafer 2 are the difference in the refractive power of flint glass and the curvature of the seat to which the wafer is attached and the additional factor in determining the focal power of the second wafer 3 is the difference in curvature of the seat on which it is mounted.

Figs. 2 to 12 inclusive illustrate various steps in the process of forming my improved multifocal lens. Fig. 2 represents the original form of a piece of crown glass A from which the body portion of the lens is made. This piece is preferably thicker at one side than at the opposite side forming an inclined surface 4 which is ground throughout its entire extent to form a concave depression, presenting a curved surface 5 preferably extending entirely across the lens and of the proper radius to form the seat for the first wafer. The first wafer is made from a piece of glass represented at 6, Fig. 4, which is ground upon one side to form a convex surface 7 fitting the curved seat 5, upon which it is mounted at one edge of the piece A, as shown in Fig. 6, and the contacting surfaces united by fusion. The piece of crown glass A with the piece of flint glass fused thereto, as shown in Fig. 6, is then reground to form a second concave depression, presenting a curved seat 8 of the proper radius to form a seat for the second wafer, said curved seat 8 preferably extending entirely across the lens, and cutting both the crown glass body portion A and the flint glass wafer 6. The second wafer is then formed from a piece of flint glass 9. Fig. 8, which is ground on one side in convex form at 10 to fit the curvature of the seat 8 to which it is applied in the position shown in Fig. 10, being placed nearer the center of the lens and overlapping both the crown glass body portion A and the flint glass wafer 6. The lens is then completed by grinding its anterior surface to the desired shape, in the present instance represented by the convex curve 11, Fig. 11, forming a continuous curved surface through the body portion of the crown glass and through the two overlapping wafers, reducing the wafers, in cross section, to the forms shown at 2 and 3, Figs. 11 and 12. The posterior surface of the lens is then ground to the desired shape, in the present instance represented by a concave curvature as shown by the line 12, Fig. 12, thereby completing the lens.

I do not claim broadly a trifocal lens formed by uniting wafers of flint glass to a body portion of crown glass, neither do I claim broadly different focal powers in a lens by the use of glass having different refractive powers.

In my improved lens I secure different focal powers between two wafers of substantially the same refractive power by mounting them upon overlapping curved seats of different radii, and by my improved method of construction I am enabled to unite wafers to the body portion of the lens by fusion of their contacting surfaces and to grind the composite lens so formed so as to produce wafers similar in outline, of comparatively small area and with thin edges so that the presence of the wafers upon the body portion of the lens is scarcely discernible when worn.

In the accompanying drawings I have shown a lens concavo-convex in cross section known as a toric lens, but the lens could be of such shape as occasion demanded and the different sections or fields can be focalized to suit the eyes of the wearer.

I claim,

1. As an article of manufacture, a lens for eyeglasses, comprising a body portion having attached thereto two pieces of glass having different refractive powers from said body portion, said pieces overlapping each other and being mounted upon curved seats of different radii.

2. In a lens for eyeglasses, the combination with a body portion focalized for a long distance field or vision, of a wafer of different refractive power attached near one edge of said body portion and mounted upon a curved seat giving a short distance field or vision, and a second wafer of different refractive power from said body portion attached nearer the center of the lens and overlapping the edge of said first wafer, said second wafer being mounted upon a curved seat of greater radius than the seat of said first wafer giving an intermediate field or vision.

3. A lens for eyeglasses comprising a body portion and two wafers of different refractive power mounted upon curved seats of different radii, with one of said wafers overlapping the other.

4. A lens for eyeglasses, comprising a body portion with two wafers of different refractive power mounted upon curved seats of different radii, with one of said wafers overlapping the other, and with the exposed surfaces of both wafers lying in the plane of the surface of the completed lens.

5. A lens for eyeglasses, comprising a body portion having two wafers of different refractive power from said body portion, mounted on curved seats of different radii and in contact with said body portion.

6. A lens for eyeglasses, comprising a body portion having two wafers of the same refractive power, said refractive power being different from the refractive power of said body portion, said wafers being mounted upon curved seats of different radii and in contact with said body portion.

7. A lens for eyeglasses, comprising a body portion having a wafer mounted upon a curved seat in said body portion, and a second wafer mounted upon a curved seat of different radius, with part of said second wafer in contact with said body portion and part in contact with said first wafer.

8. A lens for eyeglasses, comprising a body portion having communicating curved seats of different radii, with glass of different refractive power from said body portion fused into said seats of different radii.

9. A lens for eyeglasses, comprising a body portion having a curved seat, with a portion of said curved seat ground on one radius and the remainder of said seat ground upon a lesser radius and with glass of a different refractive power from said body portion fused into said curved seat, thereby making a lens of three fields or visions.

10. A lens, comprising a main lens having communicating depressions, a supplemental lens secured in one of said depressions and tapering to its edge and having its upper sire forming a part of and continuing the curvature of the other depression, and a second and larger supplemental lens filling said other depression and bearing a superimposed relation to the main lens and the first named supplemental lens and like the latter tapering to its edge; the supplemental lenses being of different refractive power or index of refraction from the main lens.

11. A tri-focal lens, comprising a crown glass field having a pair of communicating depressions, and a pair of flint glass fields of different size, superimposed with relation to each other and the crown glass and each secured to the latter in one of its depressions, one of the flint glass fields being disposed between the other flint glass field and the crown glass field and both of said flint glass fields tapering to the point where they merge into the crown glass field.

ALBERT J. BOWERS.

Witnesses:

PENELOPE COMBERBACH,
NELLIE WHALEN.